(12) United States Patent
Moreau et al.

(10) Patent No.: US 10,036,416 B2
(45) Date of Patent: Jul. 31, 2018

(54) SWIVEL CONNECTOR ASSEMBLY

(71) Applicant: Ty-Flot, Inc., Manchester, NH (US)

(72) Inventors: Darrell A. Moreau, Manchester, NH (US); Andre W. Moreau, Bedford, NH (US)

(73) Assignee: Ty-Flot, Inc., Manchester, NH (US)

( * ) Notice: Subject to any disclaimer, the term of this patent is extended or adjusted under 35 U.S.C. 154(b) by 543 days.

(21) Appl. No.: 14/821,943

(22) Filed: Aug. 10, 2015

(65) Prior Publication Data

US 2015/0345546 A1    Dec. 3, 2015

Related U.S. Application Data

(63) Continuation-in-part of application No. 14/686,839, filed on Apr. 15, 2015, now Pat. No. 9,526,322, and a continuation-in-part of application No. 14/045,593, filed on Oct. 3, 2013, now abandoned.

(51) Int. Cl.
| | |
|---|---|
| *B66C 1/66* | (2006.01) |
| *F16C 11/06* | (2006.01) |
| *A45F 5/02* | (2006.01) |
| *A45F 5/14* | (2006.01) |
| *B25H 3/00* | (2006.01) |
| *A45F 5/00* | (2006.01) |

(52) U.S. Cl.
CPC .............. *F16C 11/06* (2013.01); *A45F 5/021* (2013.01); *A45F 5/14* (2013.01); *B25H 3/00* (2013.01); *A45F 2005/006* (2013.01); *A45F 2200/0575* (2013.01); *Y10T 403/32983* (2015.01)

(58) Field of Classification Search
CPC .............. B66C 1/66; Y10T 403/32213; Y10T 403/32975; Y10T 403/32221; Y10T 403/32606
See application file for complete search history.

(56) References Cited

U.S. PATENT DOCUMENTS

| | | | |
|---|---|---|---|
| 297,684 A | | 4/1884 | Dougherty |
| 2,212,049 A | | 8/1940 | Ryland et al. |
| 2,704,961 A | | 3/1955 | Weil |
| 4,322,077 A | | 3/1982 | Van't Hof |
| 4,432,663 A | | 2/1984 | Lasak et al. |
| 4,591,156 A | | 5/1986 | Attenni |
| 4,641,986 A | * | 2/1987 | Tsui ........................ B66C 1/66 24/115 K |
| 5,248,176 A | * | 9/1993 | Fredriksson .............. B66C 1/34 248/499 |
| 5,274,887 A | | 1/1994 | Fudaki |
| 5,405,210 A | * | 4/1995 | Tsui ........................ B21K 1/72 403/119 |
| 5,586,801 A | * | 12/1996 | Sawyer ................... B23K 9/207 294/215 |
| 5,655,263 A | | 8/1997 | Stoller |

(Continued)

*Primary Examiner* — Daniel J Wiley
(74) *Attorney, Agent, or Firm* — Robert R. Deleault, Esq.; Mesmer & Deleault, PLLC

(57) ABSTRACT

A swivel connector assembly has a pin member, a collar member, and a connector. The connector defines a partially-open ring with arm ends spaced apart from each other. The collar member has recesses to receive the arms and permit the connector to pivot about the arms. The pin member extends through a central aperture of the collar member, with the collar member permitted to rotate about the pin member while coupled to the connector.

18 Claims, 10 Drawing Sheets

(56) References Cited

U.S. PATENT DOCUMENTS

| | | | |
|---|---|---|---|
| 6,216,319 B1 | 4/2001 | Elkins | |
| 6,349,985 B1 | 2/2002 | Aston | |
| 7,114,872 B2* | 10/2006 | Alba | F16D 1/12 403/78 |
| 7,708,511 B2* | 5/2010 | Terrill | F16B 45/00 248/499 |
| 8,424,638 B1* | 4/2013 | Guthrie | E04G 21/3276 182/3 |
| 8,562,053 B2* | 10/2013 | Davidson | B66C 1/10 294/215 |
| 8,596,701 B2* | 12/2013 | Alba | B66C 1/66 294/215 |
| 8,602,705 B2* | 12/2013 | Chen | F16B 35/06 411/371.2 |
| 8,622,675 B2* | 1/2014 | Chen | F16B 35/06 411/371.2 |
| 8,622,676 B2* | 1/2014 | Chen | F16B 43/00 411/371.2 |
| 9,302,889 B2* | 4/2016 | Bateman | B66C 1/66 |
| 2002/0185873 A1* | 12/2002 | Alba | B66C 1/66 294/217 |
| 2004/0032134 A1* | 2/2004 | Hageman | B66C 1/66 294/215 |
| 2005/0012346 A1* | 1/2005 | Buck | B66C 1/66 294/215 |
| 2010/0101066 A1 | 4/2010 | Stein et al. | |
| 2010/0207406 A1* | 8/2010 | Thomeczek | B66C 1/66 294/215 |

\* cited by examiner

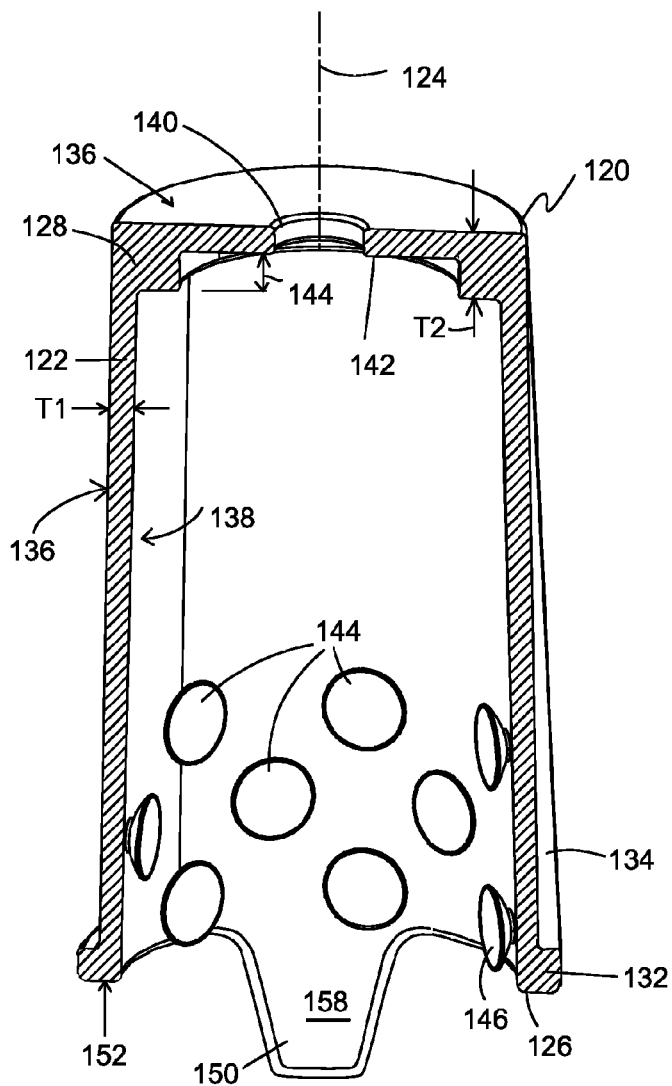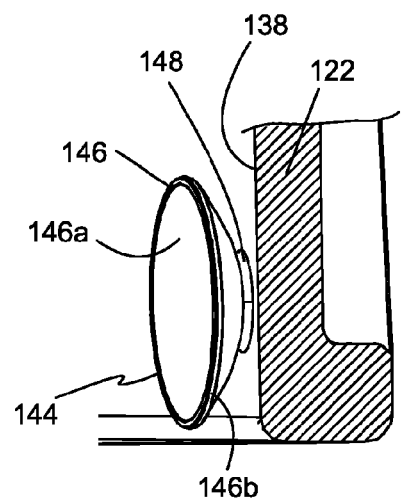
Fig. 3
Fig. 2
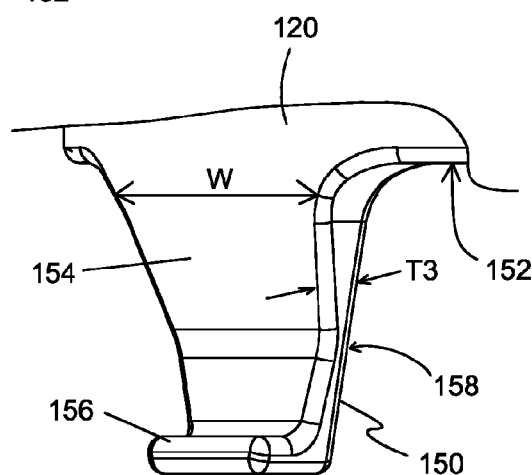
Fig. 4

SWIVEL CONNECTOR ASSEMBLY

BACKGROUND OF THE INVENTION

1. Field of the Invention

The present invention relates generally to fasteners and connector assemblies. More particularly, the present invention relates to a swivel connector assembly.

2. Description of the Prior Art

Hand tools are widely used in construction, maintenance, and industrial facilities operations. The user of a tool often stores tools in a bag, box, pouch, or tool belt when the tool is not being used. The user then selects the appropriate tool for a given task and returns the tool to its storage location after the task is complete. For tasks performed at elevated heights, dropping a tool can cause injury to individuals or damage to objects below the worker. The dropped tool also is a significant inconvenience for workers who must spend time to retrieve the dropped tool.

One method of addressing the problem of dropped tools has been to mold a sleeve snugly over and taking the shape of the tool's handle or grip. The sleeve has a solid end with an opening in the solid end through which a tether may be attached. For example, one line of tools includes hammers, hinged pliers, and adjustable spanners that have a rubber sleeve molded over the handle of the tool with a solid end portion of the sleeve extending beyond the end of the handle. A ring passes through an opening or grommet in the solid end portion of the rubber sleeve. The user clips one end of a lanyard to the ring and attaches the other end of the lanyard to the user's tool belt, scaffolding, ladder, or other object.

Another approach to preventing dropped tools is disclosed in U.S. Pat. No. 6,216,319 to Elkins for a hardware receptacle. The receptacle is a cylindrically-shaped rubber cap with an open end and a closed end. The receptacle is adapted to fit over the end of tools and pieces of hardware of different sizes and generally has a thin wall so as to be pliable and moldable to the various tools and components. Holes extend through the closed end of the receptacles to provide vents that help alleviate suction that may occur when removing a tool or piece of hardware from the receptacles, thus making it easier to remove the hardware.

A further approach to preventing dropped tools is disclosed in US published application no. 2010/0229347-A1 to Kish. The Kish published application discloses a holder adapted to be attached to a tool to prevent a dropped tool from being lost or forgotten during use. The holder has a hollow member with an open end and a closed end. The closed end has a centrally-located opening through which a swivel connector is attached. The hollow member is made of rubber or plastic and the wall of the hollow member frictionally engages or grips a tool located in the hollow member.

SUMMARY OF THE INVENTION

One limitation of the above-described approaches to tool holders is that a ring attached through an opening or eyelet formed in the end of a rubber sleeve requires a swivel-type connector to be attached to the opening in order to prevent the line from becoming coiled during use. This is because the sleeve is molded over the tool handle so it does not rotate or move relative to the tool. A further consequence is that molded sleeves generally cannot be removed from the tool and reused effectively on the same or a different tool.

Cylindrical members that are slipped over the end of a tool handle, such as described in the Kish published application, can be difficult to remove from the tool because of a tight fit or vacuum formed between the handle and the closed end of the cylindrical member. The tight fit also makes it difficult for the user to break the holder's seal on the tool or reduce the grip on the tool.

In other similar tool holders having cylindrical members, the frictional grip of the cylindrical member is reduced so that the holder is easier to remove from a tool. However, this change makes the tool holder's grip insufficient to hold heavier tools or the holder becomes unreliable because frictional engagement alone is not enough to maintain the cylindrical member on the tool handle.

In addition to the deficiencies of tool holders, swivel connector assemblies of the prior art are not configured to be attached to the handle of a hand tool. Prior art connectors that do attach to a handle get in the way of the user or fail to provide a secure connection for attaching a safety tether to the tool.

Therefore, what is needed is an improved tool holder for hand tools and other objects. The present invention achieves this and other objectives by providing a tool holder including a sleeve member with a generally cylindrical sidewall, an open end, and a closed end. The sleeve member is adapted to receive a handle or non-working end of a tool inserted along a central longitudinal axis into the open end. A rotatable connector assembly is coupled to the closed end of the sleeve member. To assist in adjusting the sleeve member and/or breaking a seal formed between the sleeve member and the tool, the sleeve member has one or more tabs that extend axially away from the open end of the sidewall. The sleeve member may additionally or alternately have at least one suction cup on an inside surface of the sidewall.

In another embodiment, the closed end of the sleeve member defines an end opening therethrough. The tool holder includes a connector assembly with a disk member having a substantially planar face sized to abut an inside surface of the closed end of the sleeve member and a shaft extending perpendicularly from the disk member and axially through the end opening of the sleeve member. A tether connector is coupled to the shaft or disk member.

In one embodiment, the closed end of the sleeve member defines an end opening therethrough. The tool holder includes a connector assembly with a pin member with a pin head that has a substantially planar face sized to abut an inside surface of the closed end of the sleeve member when a shaft extends perpendicularly from the pin head and axially through the end opening of the sleeve member.

In another embodiment, an inside surface of the closed end is concave.

In another embodiment, the sidewall tapers at between about 1 degree and about 2 degrees from the central longitudinal axis of the sleeve member.

In another embodiment, the sleeve member has two tabs spaced about 180° from one another.

In another embodiment, the tab(s) does (do) not extend radially beyond an outer surface of the sleeve member.

In another embodiment, the tabs release frictional engagement with the tool when one or more tab is pulled radially away from the tool with a predefined force, thereby at least partially separating the inside surface of the sleeve member from the tool.

In another embodiment, the sleeve member has a plurality of suction cups on the inside surface.

In another embodiment, the tabs break a suction cup seal with the tool handle when the at least one tab is pulled radially away from the tool handle with a predefined force, thereby at least partially separating the suction cup(s) from the tool.

In another embodiment, the plurality of suction cups are spaced from one another and distributed about the inside surface of the sleeve member. In one embodiment, the plurality of suction cups are evenly distributed about the inside surface.

In another aspect of the invention, a connector assembly can be used with the sleeve member, tool handle, or other work piece. The connector assembly includes a pin member, a connector, and a cap member (also referred to as a collar member in some embodiments.) For example, the connector assembly is coupled to the sleeve member positioned on the outside end of the sleeve member. The pin member extends through the end of the sleeve member with the pin head on the inside of the sleeve. The pin member engages and locks with the cap member to secure the connector assembly to the sleeve member.

In one embodiment, the pin member includes a pin shaft extending longitudinally from a shaft proximal end to a pin tip at a shaft distal end. A pin head is connected to the shaft proximal end and has a head size greater than the pin shaft. A pin spacer portion is connected on the pin shaft adjacent the pin head and has a spacer size greater than the pin shaft and smaller than the pin head. The pin spacer portion is configured to impede advancement of the pin member into a work piece. The connector includes a first arm extending to a first arm end, a second arm extending to a second arm end, where the second arm is aligned with the first arm and the second arm end spaced apart from the first arm end. A connector body portion extends between and connects the first arm and the second arm, where the first arm, the second arm, and the connector body define a partially-closed loop with a gap between the first arm end and the second arm end. The collar member includes an annular body having a top surface, a bottom surface, and a circumferential sidewall between the top surface and the bottom surface, where the annular body defines a central aperture extending axially through the body along a central axis. The central aperture is sized to receive the pin spacer portion and permit free rotation of the collar member about the pin spacer portion. A first radial aperture extends through the circumferential sidewall radially into the annular body towards the central axis. A second radial aperture extends through the circumferential sidewall radially into the annular body towards the central axis. The second radial aperture coaxially aligned with the first radial aperture. The first radial aperture and the second radial aperture are each sized and configured to receive the first arm and the second arm, respectively, of the connector and permit rotation of the connector about the first arm and the second arm. The pin member is configured to extend through the central aperture of the collar member to engage the work piece with the pin head adjacent the top surface, thereby retaining the connector coupled to the collar member while permitting free rotation of the collar member about the pin member.

In another embodiment, the first arm end and the second arm end of the connector are enlarged. The first radial aperture and the second radial aperture extend through the top surface of the collar member and the collar member defines a first axial slot extending into the body through the top surface adjacent the central aperture and a second axial slot extending into the body through the top surface adjacent the central aperture. The first axial slot and the second axial slot are spaced apart and positioned opposite of the central aperture from each other. The first axial slot and the second axial slot communicate with the first radial aperture and second radial aperture, respectively, and are sized and configured to receive the first arm end and the second arm end, respectively.

In another embodiment, the first arm end and the second arm end each have a geometry selected from a ball, a flange, a disk, or a protrusion, where the first arm end and the second arm end lock with the first axial slot and the second axial slot, respectively, to restrict radial egress of the first arm and the second arm, respectively, from the collar member.

In another embodiment, the shaft is threaded and the pin head defines a tool-engaging recess configured to engage a working end of a hand tool. For example, the tool-engaging recess has the shape of a slot, a plus, a square, a triangle, a hexagon, or a star.

In another embodiment, the pin tip is sharpened.

In another embodiment, the pin member includes a retaining structure protruding from the pin shaft and configured to engage a work piece to retain the shaft in the work piece. In one embodiment, the retaining structure is of one or more tabs, one or more wing-shaped protrusions, or a screw thread.

In another embodiment, the shaft is elongated and the pin tip comprises a tool. For example, the tool is a screwdriver tip, a socket, a sharpened tip, or other tool.

In another embodiment, a tool handle is attached to the shaft adjacent the collar member.

In another embodiment, a swivel connector assembly has a pin member with a pin shaft and pin head as described above. The assembly also includes a connector as described above. The assembly includes a cap member with a cap body having a top surface, a bottom surface, and defining a central aperture extending axially through the cap body along a central axis. The central aperture is sized to receive the shaft of the pin member and permit free rotation of the cap member about the shaft. A first radial aperture and second radial aperture each extend radially into the cap body towards the central axis, where the first radial aperture and the second radial aperture are each sized and configured to receive the first arm and the second arm, respectively, of the connector and permit rotation of the connector about the first arm and the second arm. The pin member is configured to extend into the central aperture of the cap member to engage and lock the pin tip with the cap member while permitting free rotation of the cap member about the pin member.

In one embodiment, the shaft or pin tip is a split shaft or split tip that resiliently operates between a compressed position and an expanded or relaxed position. For example, the pin tip is a resilient split tip with a catch surface facing towards the pin head, and the central aperture defines a bore shoulder. Advancing the pin tip into the central aperture past the bore shoulder causes the resilient split top to resume an expanded state, thereby allowing the catch surface to engage the bore shoulder to prevent removal of the pin member from the cap member.

In another embodiment, the first arm end and the second arm end each have a geometry selected from a ball, a flange, a disk, and a protrusion, where the first arm end and the second arm end are each received in and lock with axial recesses in the cap member to restrict radial egress of the first arm and the second arm, respectively, from the cap member.

In another embodiment, the swivel connector assembly also includes a disc member with a central disc aperture, where the disc member disposed between the cap member and the pin head with the pin shaft extending through the central disc aperture. The first arm end and the second arm end are received between the cap member and the disc member. In one embodiment, the disc member defines an annular disc recess in a top surface of the disc member.

In another embodiment, the pin member includes a bushing on the shaft and positioned adjacent the pin head, where the central disc aperture is sized to receive the bushing and where the bushing aligns with the central disc aperture when the pin head is installed in the central aperture of the cap member with the catch surface engaging the bore shoulder.

In some embodiments, the shaft is a split shaft and defines a catch surface extending radially from the shaft at the head portion. The shaft therefore has a snap fit with the cap member when the catch surface is pressed into the central aperture in a compressed state and allowed to expand to its uncompressed state upon passing through the central aperture.

In some embodiments, the connector has a first arm and a second arm aligned with one another and separated by a predefined distance. The connector may take many forms, such as an open D-ring connector or a flexible length of cable, for example. Optionally, the connector's first arm end and second arm end are enlarged relative to the respective arms.

In some embodiments, the connector is configured to pivot about a pivot axis that extends along the connector arms, which engage the cap member. In some embodiments, the cap member is configured to rotate about the central longitudinal axis extending through the sleeve member and pin member. In other embodiments, the connector rotates about the central longitudinal axis independently of the cap member or the pin member.

In some embodiments, the connector assembly also includes a disc member with a centrally-located opening therethrough and sized to receive the shaft of the pin member. The disc member has a top surface defining an annular recess. The connector assembly further includes a cap member with a central aperture extending axially therethrough, a top surface, and a bottom surface. The bottom surface defines at least one (e.g., a pair) of connector recesses opposite the central aperture and each sized to at least partially receive the enlarged first-end portion and the enlarged second end-portion, respectively, of the connector. The cap member is rotatable about the shaft with the enlarged first-end portion and the enlarged second-end portion of the connector each disposed between the respective connector recess and the annular recess of the upper pin member.

In another embodiment, the connector assembly is retained coupled to the sleeve member with a feature such as a nut threaded onto the shaft, a retaining ring installed on the shaft, a snap fit with the sleeve member, a snap fit with a member other than the sleeve member, an opening through the shaft and a connector extending through the opening, or an enlargement on the shaft that abuts an outside surface of the closed end of the sleeve member.

A method of securing a tool to a tether includes providing a tool holder having a sleeve member with a generally cylindrical sidewall, an open end, and a closed end, where the sleeve member is adapted to receive a non-working end of a tool inserted into the open end along a central longitudinal axis. A connector is coupled to the closed end of the sleeve member. The sleeve member has at least one tab extending axially away from an open end of the sidewall, and/or at least one suction cup on an inside surface of the sidewall. The method also includes the step of inserting the non-working end of the tool into the open end of the sleeve member a distance sufficient to establish a frictional grip between the sleeve member and the tool. A first end of the tether is connected to the connector. Preferably, the frictional grip and/or a vacuum seal formed by the suction cup(s) is sufficient to retain the tool holder on the tool when the tool holder is connected to a tether and the tool is dropped from a distance of three to six feet or more.

In another embodiment, the method includes pulling one or more tab radially away from the non-working end of the tool to break the frictional grip between the sleeve member and the tool and the step of removing the tool from the sleeve member.

In another embodiment of the method, the method includes a method for providing a swiveling and rotating attachment point to a hand tool or a tool holder for a hand tool. The method includes providing a swivel connector that has (1) a connector defining a partially closed loop wherein the partially closed loop has a first arm end and a second arm end wherein the first arm end and the second arm end extend toward each forming a gap between the first arm end and the second arm end. The method also includes providing (2) a collar member having an annular body with a circumferential portion wherein the collar member defines a central aperture therethrough, a first radial aperture extending transversely through the circumferential portion towards the central aperture, and a second radial aperture being radially aligned with the first radial aperture wherein the second radial aperture extends transversely through the circumferential portion toward the central aperture and wherein the first arm end is pivotally disposed within the first radial aperture and the second arm end is pivotally disposed within the second radial aperture. The method further includes providing (3) a pin member having a pin head and a pin shaft wherein the pin shaft extends through the central aperture of the collar member to retain the connector in coupling engagement to the collar member while permitting free rotation of the collar member about the pin shaft. Finally, the method includes attaching the swivel connector to either the hand tool or the tool holder for a hand tool.

BRIEF DESCRIPTION OF THE DRAWINGS

FIG. 2 illustrates a sectional view of one embodiment of a sleeve member of the present invention showing suction cups on the inside surface and tabs extending from a lower end of the sleeve member.

FIG. 3 illustrates an enlarged perspective view of one embodiment of a suction cup of the present invention.

FIG. 4 illustrates an enlarged perspective view of one embodiment of a tab of the sleeve member of FIG. 2.

DETAILED DESCRIPTION OF THE PREFERRED EMBODIMENT

Figure 1:
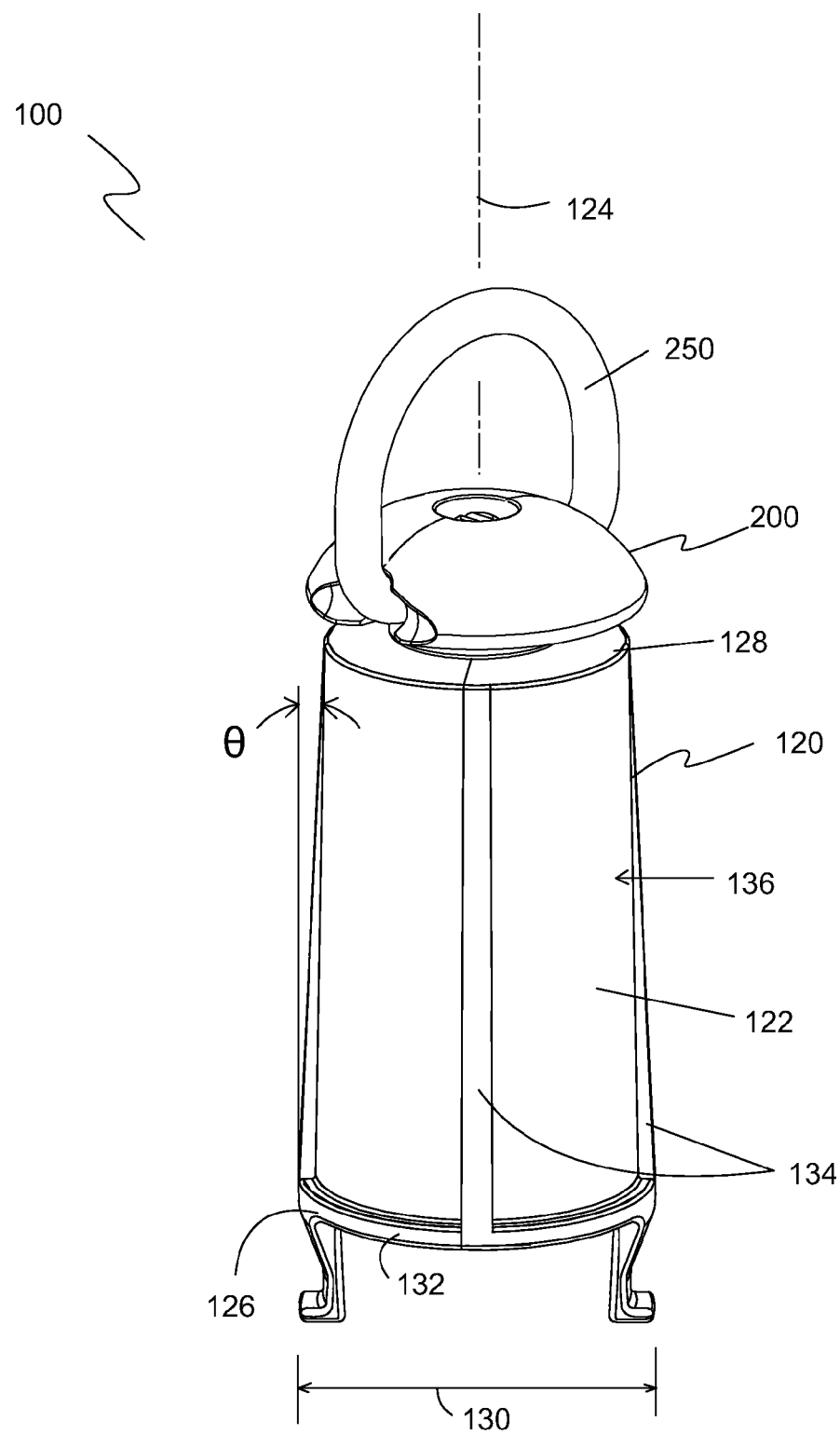
FIG. 1 illustrates a perspective view of one embodiment of tool holder that includes a sleeve member and a connector assembly coupled to the sleeve member.

The preferred embodiments of the present invention are illustrated in FIGS. 1-14. FIG. 1 illustrates a perspective view of one embodiment of a tool holder 100 with a sleeve member 120 and a connector assembly 200 with a connector 250. Sleeve member 120 is hollow with a generally cylindrical sidewall 122 extending along a central longitudinal axis 124. Sleeve member 120 has an open end 126 and a closed end 128. In one embodiment, sidewall 122 tapers in diameter 130 from open end 126 to closed end 128 between one and two degrees. In one embodiment, sidewall 122 defines an angle θ of about 1.25° relative to central longitudinal axis 124. The taper or angle of sidewall 122 is for ease of manufacture, such as in injection molding, and also provides a slightly larger diameter 130 at open end 126 for inserting the end of a tool 10 (shown in FIG. 5) into sleeve member 120. Sleeve member 120 is made of a flexible and resilient material, such as rubber or plastic.

Sleeve member 120 preferably has a rim 132 at open end 126. Rim 132 is a portion of sleeve member 120 that protrudes radially outward from outside surface 136 of sleeve member 120. In one embodiment, rim 132 is formed by a region of increased thickness at open end 126. Rim 132 prevents and/or minimizes sleeve member 120 from tearing when being stretched over a tool handle or when being removed from a tool handle. Rim 132 also provides an edge for the user to grasp when adjusting the fit of or removing sleeve member 120 from a tool handle.

In one embodiment, sleeve member 120 has a plurality of ribs 134 extending axially between open end 126 and closed end 128. Preferably, ribs 134 extend from rim 132 to closed end 128. Ribs 134 provide rigidity to sleeve member 120 and reduce twisting of sleeve member 120 when subjected to torsional forces.

Turning now to FIG. 2, a perspective view is illustrated of a longitudinal section of sleeve member 120, where the section is taken vertically through sleeve member 120 along central longitudinal axis 124. In one embodiment, ribs 134 are substantially flush with outside surface 136 of sleeve member 120 at or near closed end 128 and then gradually increase in thickness and protrude from outside surface 136 so that ribs 134 are substantially flush with rim 132 at open end 126.

Sidewall 122 has a wall thickness T1 between outside surface 136 and inside surface 138. In one embodiment, wall thickness T1 is substantially the same from rim 132 to closed end 128 (excluding ribs 134 and rim 132). In another embodiment, wall thickness T1 tapers slightly from closed end 128 to open end 126 (excluding ribs 134 and rim 132). A tapered wall thickness T1 makes sleeve member 120 more pliable towards open end 126 and less pliable towards closed end 128. A difference in pliability makes sleeve member 120 easier to install or remove from a tool handle due to the ability to more easily stretch or deform sleeve member 120 towards open end 126. Where wall thickness T1 is greater towards closed end 128, the reduced pliability at closed end 128 provides for a stronger grip on tool 300 (shown in FIG. 7) when sleeve member 120 is positioned (sometimes forced) onto tool 300.

Closed end 128 has an end thickness T2 between outside surface 136 and inside surface 138. In one embodiment, end thickness T2 is greater than wall thickness T1. In one embodiment, inside surface 138 at closed end 128 is concave to more snugly fit to a rounded end of a tool handle. Optionally, an eyelet or connector tab (not shown) is formed integrally with sleeve member 120 and connected on outside surface 136 of closed end 128.

In one embodiment, closed end 128 defines an end aperture 140 extending axially through closed end 128. End aperture 140 is preferably centrally located or centered on central longitudinal axis 124 but may optionally be positioned off-center of closed end 128. When sleeve member 120 has end aperture 140, sleeve member optionally defines an end recess 142 with a recess depth 144 into inside surface 138 of closed end 128. End recess 142 provides a seat for a pin head 211 of a pin member 210 of connector assembly 200, which is shown in FIG. 5 and discussed in more detail below.

Sleeve member 120 optionally has a plurality of suction cups 144 on inside surface 138. FIG. 3 illustrates an enlarged, side perspective view of one embodiment of suction cup 144 as also shown in FIG. 2. In one embodiment, suction cups 144 have a cup portion 146 extending from a neck portion 148 connected to inside surface 138 of sleeve member 120. Cup portion 146 has a concave inside cup surface 146a encircled by a cup rim 146b. Suction cups 144 may alternately be formed in sidewall 122 where inside cup surface 146a is recessed into inside surface 138 of sidewall 122 and cup rim 146b is flush with or protrudes radially inward from inside surface 138 of sidewall 122. In one embodiment, sleeve member 120 has an array of suction cups 144 on inside surface 138, such as three rows of suction cups distributed in a checkerboard pattern around inside surface 138 towards open end 126 of sleeve member 120. Suction cups 144 provide for an increased grip on a tool handle due to the combination of vacuum and friction forces acting together.

Turning now to FIG. 4 and with continued reference to FIG. 2, one embodiment of sleeve member 120 has at least one ear or tab 150 extending axially from open end margin 152. FIG. 4 illustrates a front perspective view of one embodiment of tab 150, which is also shown in other views in FIGS. 1 and 2. In one embodiment, tab 150 has a body portion 154 and a foot portion 156. Body portion 154 preferably tapers in width W and tab thickness T3 from its connection at open end margin 152 to foot portion 156. Foot portion 156 extends transversely outward from body portion 154 to be grasped by the user. In one embodiment, foot portion 156 extends perpendicularly from body portion 154. Other shapes for tabs 150 are also acceptable, such as rectangular or rounded. Inside surface 158 of tab 150 is preferably continuous with and seamless with inside surface 138 of sleeve member. Tabs 150 preferably do not extend radially beyond open end margin 152 of sleeve member 120.

Figure 5:
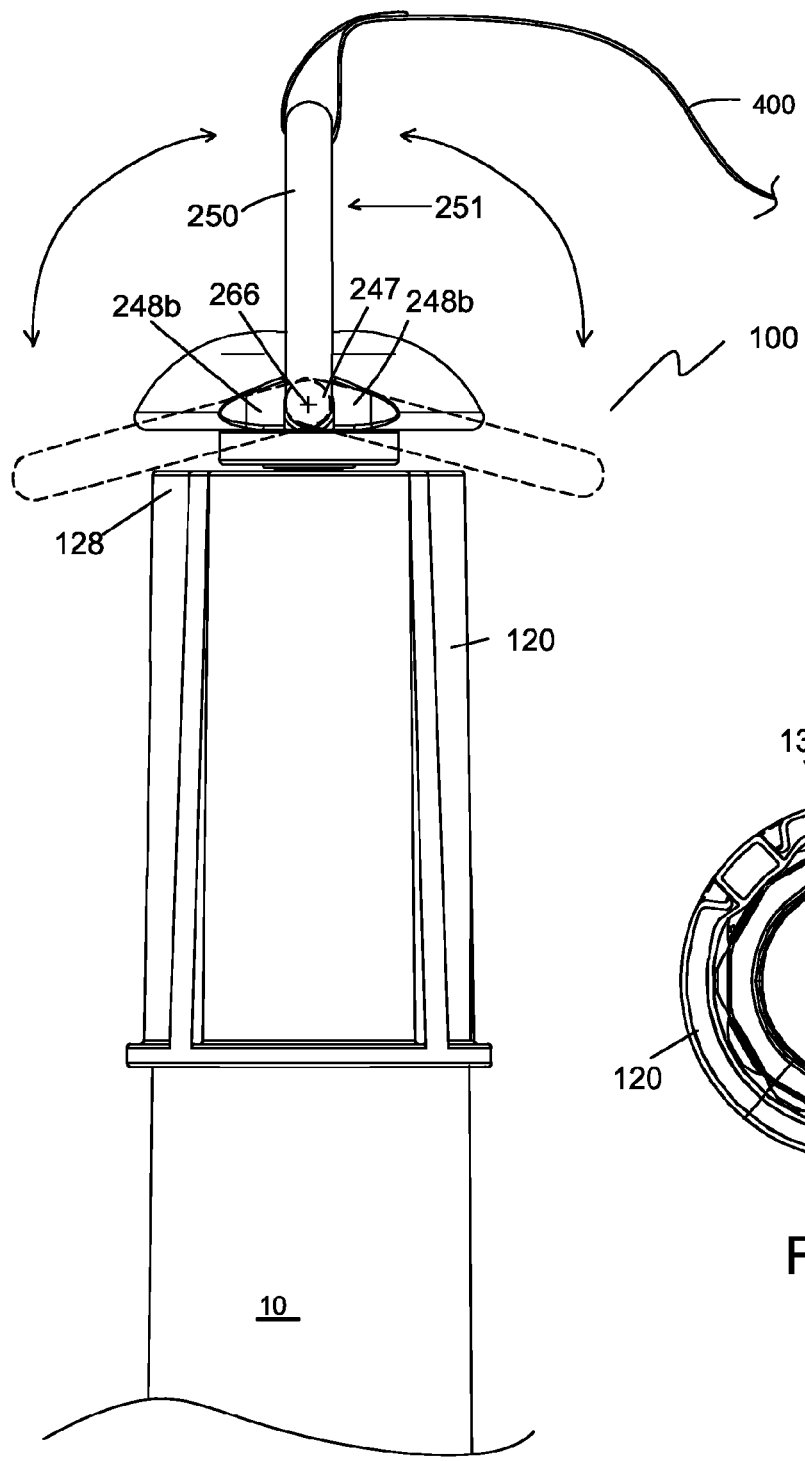
FIG. 5 illustrates an elevational view of the tool holder of FIG. 1 shown installed on a tool handle.

Referring now to FIG. 5, a side view of an embodiment of tool holder 100 is illustrated without tabs 150. Tool holder 100 is installed on the non-working end of tool 10. Connector 250 is in an upright position and connected to a tether 400. Connector 250 in one embodiment is capable of moving between positions shown in dashed lines where connector 250 is received in side channels 248b of cap member 240. This range of movement is achieved by connector 250 pivoting about pivot axis 266 that extends through side openings 247. When connector 250 is sufficiently large, it potentially can pivot 360° about pivot axis 266 provided that sleeve member 120 (and any tool attached to tool holder 100) can pass through ring opening 251.

Figure 6:
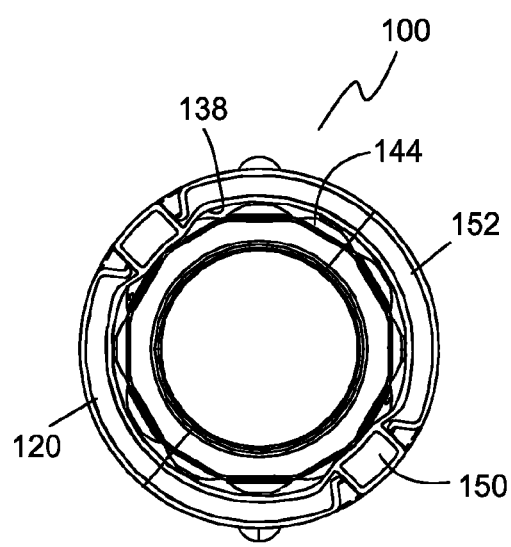
FIG. 6 illustrates an end view looking into the open end of one embodiment of a sleeve member with suction cups and tabs.

Referring now to FIG. 6, a bottom view of tool holder 100 shows a plurality of suction cups 144 on inside surface 138 of sleeve member 120. Tabs 150 extend axially from open end 126 and preferably do not radially exceed open end margin 152.

In use, tool holder 100 is installed on the non-working end of a tool 10 with sleeve member 120 frictionally engaging and gripping tool 10. When sleeve member has suction cups 144, it additionally grips tool 300 due to suction cups 144 forming an vacuum seal with tool 10. Thus, tool holder 100 is securely retained on tool 300 and can be used, for example, as a retaining or safety device to prevent accidental drops of tool 10. In such an use, the user clips, couples, or attaches a tether 400, lanyard, safety line, or connector to connector 250 coupled to closed 128 of sleeve member 120. The opposite end (not shown) of tether 400 is then attached, for example, to the user's safety harness, a structure, a tool belt, or other item.

To remove tool holder 100 from tool 10, the user breaks or reduces the grip between sleeve member 120 and tool 10 by pulling outward and/or upward on one or more tabs 150. When tool holder 100 is not equipped with tabs 150, the user may instead grasp open end margin 152 and pull outward to break or reduce the grip between sleeve member 120 and tool 10.

Figures 7, 7A:
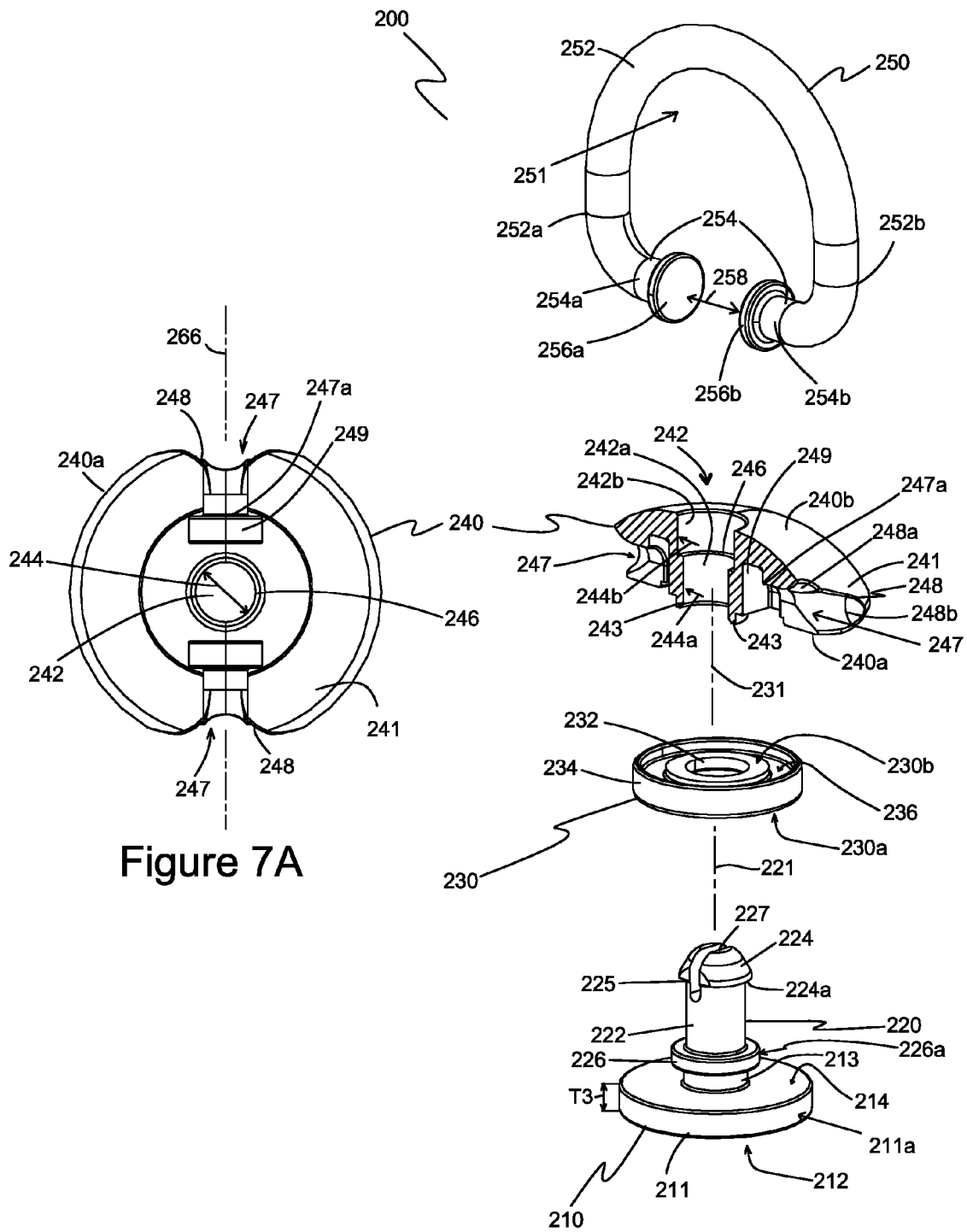
FIG. 7 illustrates a perspective view of components of the connector assembly of FIG. 1 shown disassembled, where the cap member is shown in a sectional view.
FIG. 7A illustrates a bottom plan view of one embodiment of a cap member of the present invention showing connector recesses and side openings.

Turning now to FIG. 7, one embodiment of connector assembly 200 is shown in an exploded, perspective view. Here, connector assembly 200 includes a pin member 210 that includes a pin shaft 220 connected to and extending axially from a pin head 211 to a pin tip 224 at a shaft distal end 225, a cap/collar member 240, a connector 250, and an optional disc member 230.

In one embodiment of pin member 210, pin head 211 is a circular plate with a disk thickness T3 between a proximal surface 212 and a distal surface 214. In one embodiment, pin head thickness T3 is approximately equal to or less than recess depth 144 of end recess 142 in sleeve member 120 (shown in FIG. 2). Distal surface 214 is preferably planar and substantially featureless and is sized to engage and mate with another component of connector assembly. In one use, for example, distal surface 214 is configured to engage a work piece, such as inside surface 138 of closed end 128 of sleeve member 120 (shown in FIGS. 1-2) with shaft 220 extending through end aperture 140. In other uses, distal surface 214 is configured to engage disc member 230 or cap/collar member 240. In other embodiments, proximal surface 212 is domed.

In one embodiment of pin member 210, shaft 220 has a cylindrical shape with a shaft diameter 220a. Shaft 220 extends along a shaft axis 221 with pin tip 224 at distal end 225 and a bushing 226 abutting or near pin head 211 at proximal end 213. In one embodiment, pin tip 224 is a split shaft having a slot 227 extending axially into pin tip 224 and, in some configurations, also into shaft 220. In one embodiment, pin tip 224 has a domed shape to facilitate insertion through openings and to cause compression of a split head embodiment of pin tip 224. In one embodiment, pin tip 224 has at least one catch surface 224a that extends radially outward from shaft 220. The split-head configuration and catch surface 224a enables a snap fit where pin tip 224 compresses during insertion through an opening of slightly smaller diameter and then expands to its uncompressed shape after passing through the opening. After returning to its uncompressed shape, catch surface 224a engages the material around the opening to prevent pin tip 224 from passing back through the opening in the opposite direction. In one embodiment, bushing 226 is positioned along shaft body 222 so that it is positioned on the outside of end aperture 140 of sleeve member 120 (shown in FIG. 2) when distal face 214 of pin head 211 abuts inside surface of sleeve member 120 (shown in FIG. 2). In some embodiments, shaft 220 is integrally formed as one piece with pin head 211. Optionally, bushing 226 is connected to or is a monolithic structure with shaft 220 and pin head 211. Pin member 210 may be made of metal, plastic, composites, or other materials.

In one embodiment, optional disc member 230 has a generally flat, circular shape with a proximal surface 230a, a distal surface 230b, and centrally-located disk opening 232 extending therethrough along a central axis 231 of disc member 230. Preferably, central axis 231, shaft axis 221, and central longitudinal axis 124 are the same axis. Located radially between disk opening 232 and an outside edge 234 is an annular recess 236 formed axially into distal surface 230b. Annular recess 236 is sized to receive ends 256 of connector 250 and permit connector 250 to rotate about central axis 228 with ends 256 partially received therein. Connector 250 is discussed in more detail below. In one embodiment, disk opening 232 is sized to receive shaft 220 with bushing 226 disposed within disk opening 232. In another embodiment, a proximal surface recess 235 (shown in FIG. 6) extends axially into proximal surface 230a of disc member 230 and is sized to receive bushing 226. In such an embodiment, bushing 226 is received in proximal surface recess 235 rather than in disk opening 232.

An axial section of cap/collar member 240 is illustrated in a perspective view in FIG. 7. FIG. 7A illustrates a bottom plan view of cap/collar member 240 showing proximal surface 240a. In one embodiment, cap/collar member 240 has a round, generally disk-like shape with a proximal surface 240a, a distal surface 240b, and a central aperture 242 extending axially therethrough. In one embodiment, central aperture 242 is a bore that extends through cap/collar member 240 and has a single bore diameter 244. In such an embodiment, catch surface 224a of shaft 220 engages distal surface 240b when pin tip 224 returns to its normally-uncompressed state after passing through central aperture 242. Engagement of catch surface 224a and distal surface 240b retains cap/collar member 240 coupled to pin member 210.

In another embodiment as shown in FIGS. 7-7A, central aperture 242 has a plurality of coaxial bores with different bore diameters 244, where the intersection between a first bore 242a (e.g., a smaller bore diameter 244a) with a second bore 242b (e.g., a larger bore diameter 244b) defines a bore shoulder 246. Bore shoulder 246 provides a surface to engage catch surface 224a of pin member 210. Thus, pin member 210 creates a snap fit with cap/collar member 240, where pin tip 224 engages bore shoulder 246 to retain cap/collar member 240 on shaft 220. Therefore, pin tip 224 can be configured and sized to remain within second bore 242b or to otherwise not extend from cap/collar central aperture 242 beyond distal surface 240a.

In yet another embodiment, there is define at least one recess (not shown) formed or machined into a wall of central aperture 242. An example of such a recess is a slot extending circumferentially at least partially around central aperture 242 and having a diameter greater than bore diameter of central aperture 242. A slot or recess may be used, for example, when shaft 220 has spring-biased ball or pin that is configured to extend from shaft 220 into the recess to retain cap/collar member 240 on shaft 220.

In one embodiment, cap/collar member 240 has side openings 247 that each extend transversely (e.g., radially) into cap/collar member 240 from a circumferential portion 241 between proximal/top surface 240a adjacent central aperture 242 and distal/bottom surface 240b adjacent central aperture 242 toward central aperture 242 and central axis 231. Preferably, an entrance 248 to each side opening 247 is recessed into cap/collar member 240 and shaped to permit rotation of connector 250 about side openings 247. One example of entrance 248 is a countersink or conical hole machined or formed into cap/collar member 240 at side openings 247. Another example of entrance 248 is one or more channels that intersect side opening 247 and extend transversely thereto. In one embodiment, entrance 248 has an upper channel 248a and at least one side channel 248b. Preferably, channels 248a, 248b receive connector 250 and provide a preferred stopping point for connector 250 as it rotates about side openings 247 due to cap/collar member 240 causing ends 254 of connector 250 to separate slightly more at points of rotation between channels 248a, 248b. Thus, connector 250 in one embodiment occupies one of channels 248a, 248b and "snaps" to these positions due to its preference to return to its non-expanded state when rotated to occupy a channel 248.

In one embodiment, cap/collar member 240 optionally has an axial slot 249 at an inside end 247a of one or both of side openings 247, where inside end 247a of side opening 247 is the end towards central aperture 242. Axial slot(s) 249 extend axially into proximal surface 240a and define an open space in communication with side opening 247. Axial slots 249 are sized and configured to accommodate an end 256 of connector 250, such as a flange, ball, or other structure (discussed in more detail below). As such, arms 254 of connector 250 are prevented from being pulled radially out of collar member 240. In one embodiment, axial slots 249 have a rectangular or arched cross-sectional shape as viewed from side opening 247 that permits insertion of end 256 of connector 250 in an axial direction from proximal surface 240a.

In one embodiment, distal surface 240b is domed. A domed distal surface 240b reduces contact between a tether 400 (shown in FIG. 5) or lanyard attached through connector opening 251 and along the perimeter edge 240a of cap/collar member 240, thereby reducing wear on tether 400. A domed distal surface 240b also provides more space for rotation of connector 250 about a pivot axis 266 that extends through side openings 247 perpendicularly to shaft 220 or central longitudinal axis 124. Thus, when pin member 210 is assembled with connector 250 and collar member 240, pin head 211 partially or completely covers axial slots 249 and side openings 247, thereby preventing connector 250 from decoupling from cap/collar member 240.

In one embodiment, cap/collar member 240 includes a bore sidewall extension 243 extending around central aperture 242 and extending axially from proximal surface 240a. In one embodiment, bore sidewall extension 243 abuts distal surface 230b of disc member 230 between disc opening 232 and annular recess 236. In another embodiment, bore sidewall extension 243 is received in disc opening 232 to seat and position cap/collar member 240 coaxially with disc member 230.

Referring again to FIG. 7, one embodiment of connector 250 substantially defines a closed or mostly-closed loop or ring around a connector opening 251. In one embodiment, connector 250 has a D shape with a curved connector body portion 252 extending between and connecting arms 254 that are coaxially aligned and extend towards one another. First arm 254a and second arm 254b are generally straight and have respective arm ends 256a, 256b spaced apart from each other by a predefined gap 258. Other shapes for body portion and connector 250 in general are also acceptable, such as circular, rectangular, triangular, irregular, and others. In one embodiment, arm ends 256 are optionally enlarged and sized to be at least partially received in axial slot 249 of cap/collar member 240. For example, arm ends 256 are a flange, ball, or protrusion sized and shaped to be received in axial slots 249. Connector 250 is preferably made of rigid plastic or metal, but may be made of other materials, such as composites, rubber, wire, cable, or other rigid or flexible materials.

Figure 8:
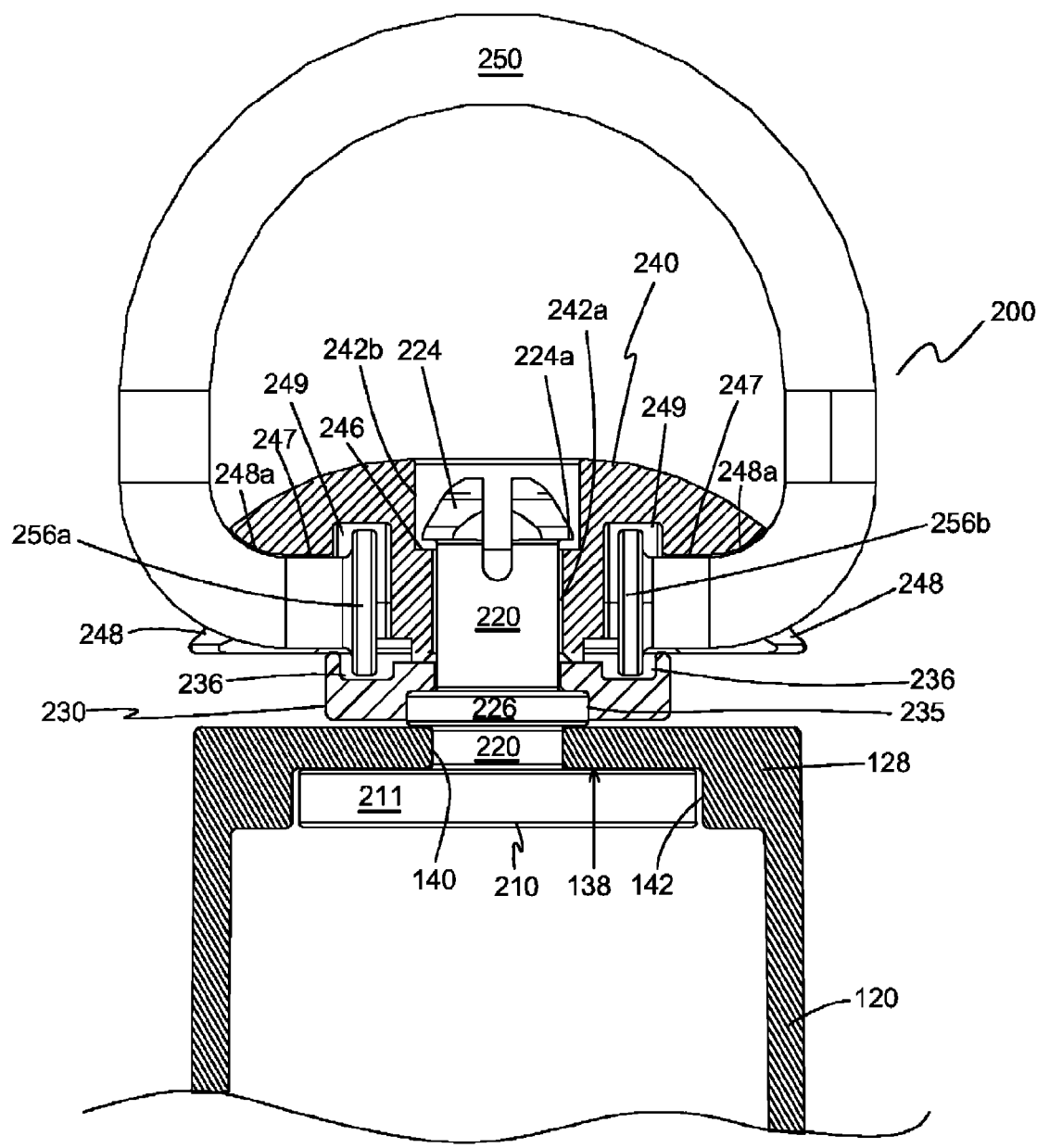
FIG. 8 illustrates a front, partial-sectional view of the connector assembly of FIG. 5 shown installed on a sleeve member.

Referring now to FIG. 8, a front view of connector assembly 200 of FIG. 7 is shown installed on sleeve member 120 of a tool holder 100. Sleeve member 120, disc member 230, and cap/collar member 240 are illustrated as sections. Pin member 210 is seated in end recess 142 of sleeve member 120 with pin head 211 abutting inside surface 138 of closed end 128. Shaft 220 is connected to pin head 211 and extends through end aperture 140 in closed end 128, through disc member 230, through first central aperture 242a of cap/collar member 240, and is positioned with pin tip 224 within second central aperture 242b. Cap/collar member 240 is retained coupled to pin member 210 by a snap fit between catch surface 224a and bore shoulder 246. Bushing 226 is received in proximal surface recess 235 of disc member 230 with disc member 230 preferably abutting bushing 226. Ends 256 of connector 250 are received between axial slots 249 of cap/collar member 240 and annular recess 236 of disc member 230. Connector 250 is adjustably retained in an upright position with connector 250 engaging channels 248a on entrance 248 of side openings 247 in cap/collar member 240.

Figure 9:
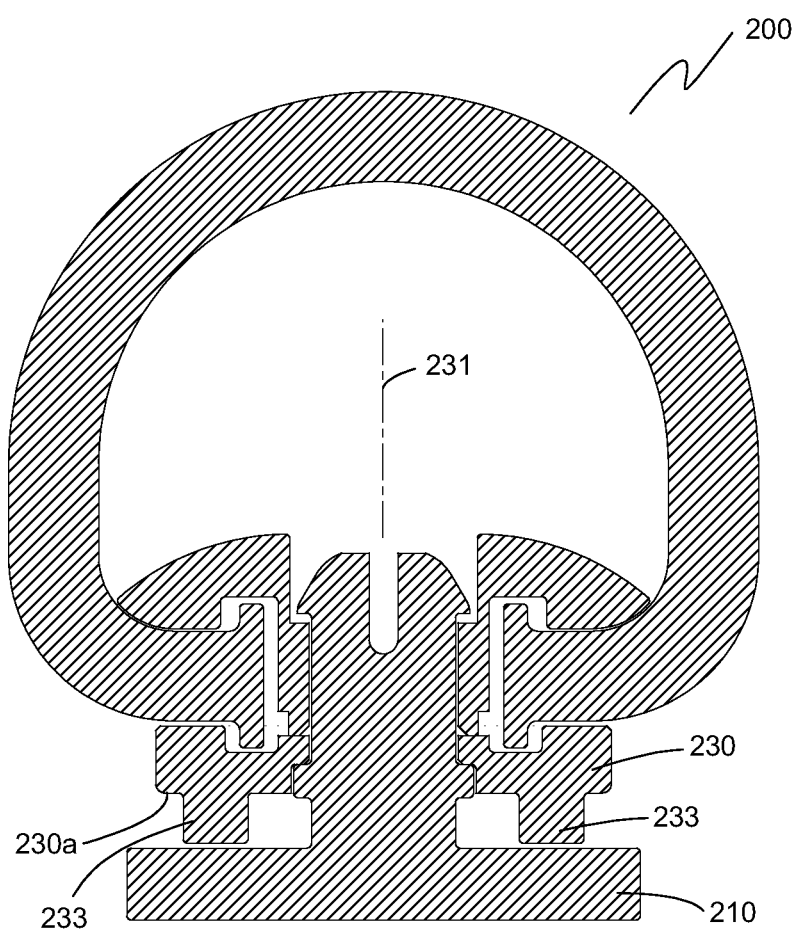
FIG. 9 illustrates a front sectional view of another embodiment of a connector assembly of the present invention showing feet protruding from a bottom surface of the disc member.

Referring now to FIG. 9, a cross-sectional view of another embodiment of connector assembly 200 is shown. Compared to the embodiment shown in FIGS. 7, 7A, and 8 discussed above, disc member 230 here includes a plurality of feet 233 extending axially from proximal surface 230a towards distal surface 214 of pin member 210. Feet 233 are sized to extend through feet openings 141 in a work piece, such as end 128 of sleeve member 120. Since feet 233 engage a work piece, such as sleeve member 120, connector 250 pivots and rotates about pin member 210 independently of disc member 230.

Figure 10:
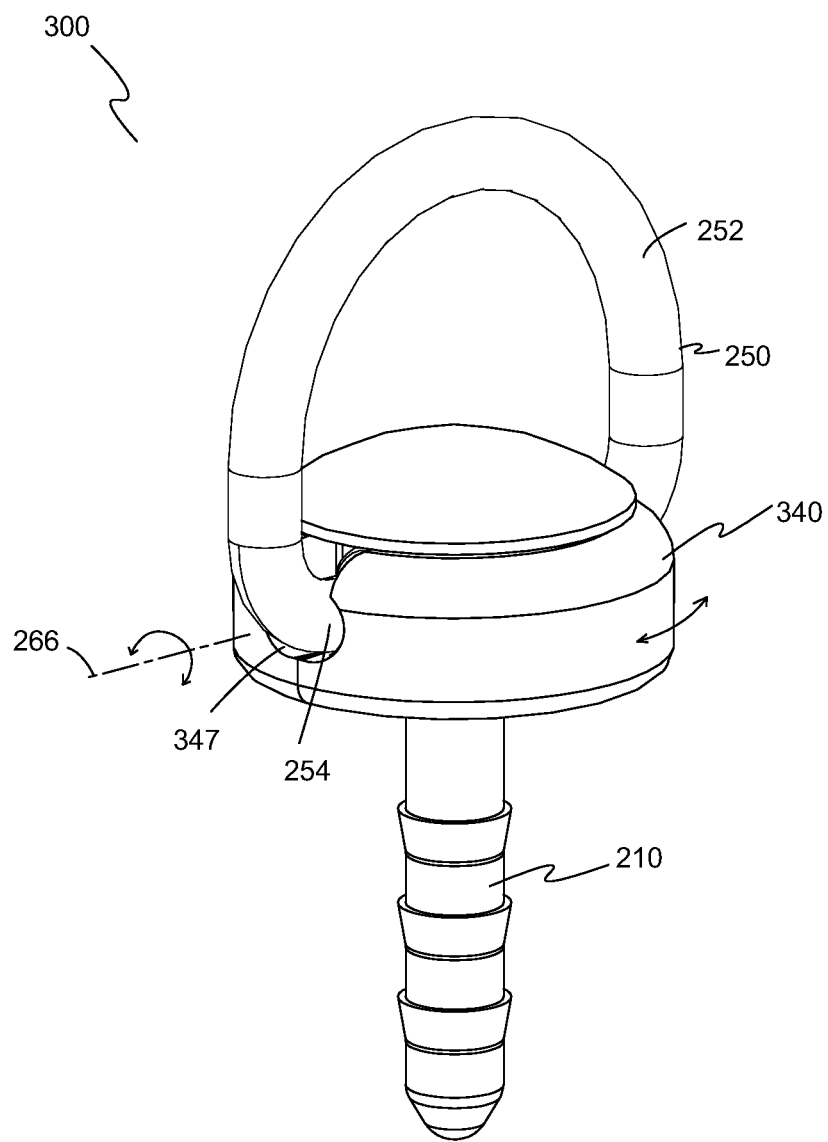
FIG. 10 illustrates a perspective view of another embodiment of a connector assembly of the present invention.

Turning now to FIG. 10, there is illustrated another embodiment of the present invention showing a swivel connector assembly 300. In this embodiment, connector assembly 300 includes connector 250, pin member 210, and collar member 340. Collar member 340 is similar to cap/collar member 240 of embodiments discussed above. Due to the different intended use of connector assembly 300, pin member 210 and collar member 340 are rotated 180° in FIG. 10 compared to the orientation of pin member 210 and cap/collar member 240, respectively, shown in FIGS. 7-9. Connector 250 swivels about axis 266 as best illustrated in FIG. 5.

Figure 11:
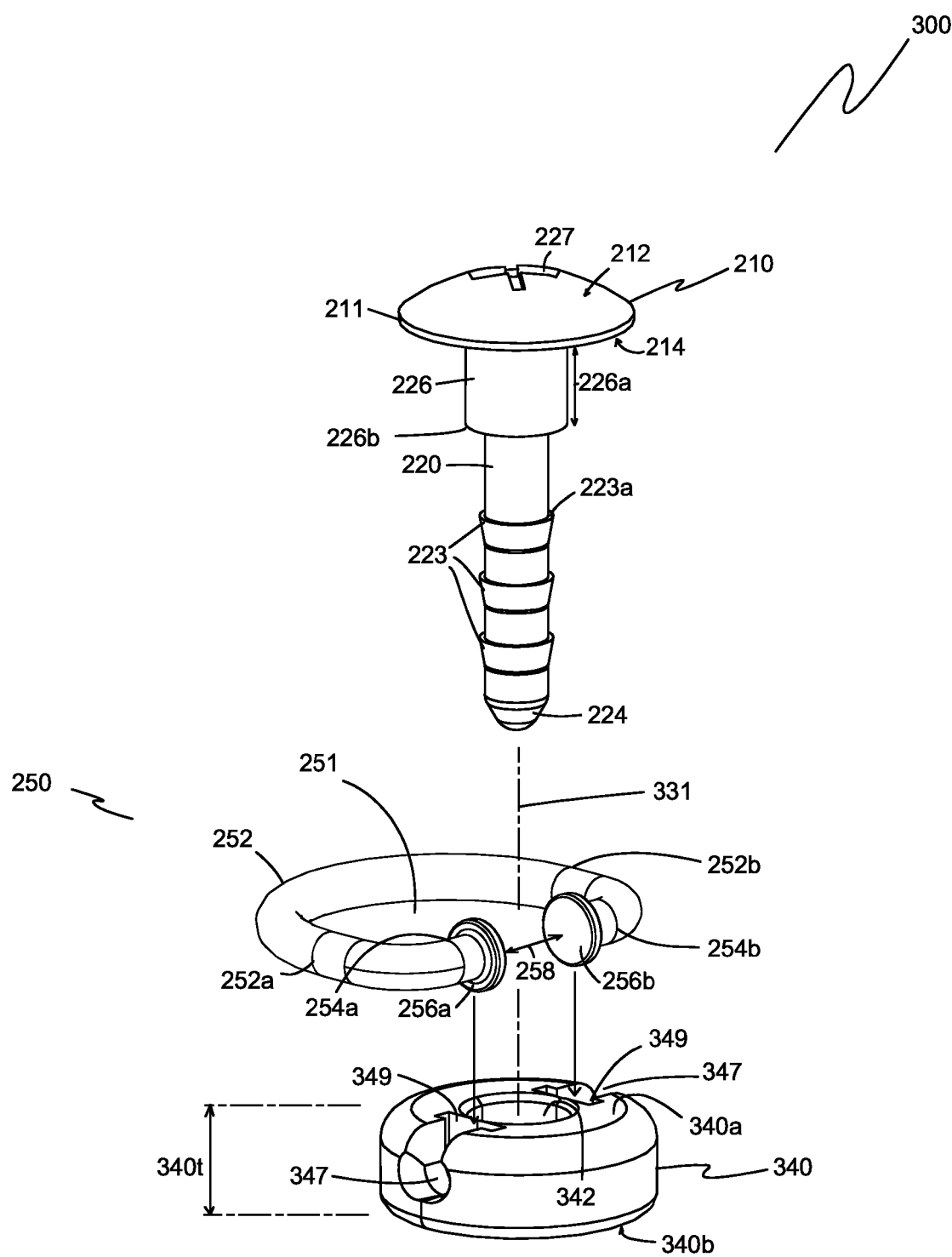
FIG. 11 illustrates an expanded, perspective view of the connector assembly of FIG. 10 showing a connector, pin member, and collar member.

FIG. 11 is an exploded, perspective view of connector assembly 300 shown in FIG. 10. Connector 250 is substantially the same as in embodiments discussed above, and includes connector body portion 252 having a first body end 252a and a second body end 252b. Connector body portion 252 extends between and connects to first arm 254a and to second arm 254b, respectively, which are coaxially aligned and extend towards each other with respective arm ends 256a, 256b spaced apart by a predefined gap 258. Except for gap 258, connector 250 defines a substantially closed loop with an opening 251. As noted above, arm ends 256a, 256b are enlarged compared to arms 254a, 254b, respectively, and may be a flange, ball, or other protrusion having a size (e.g., diameter) that is greater than the respective arm 254a, 254b. In one embodiment, arm ends 256a, 256b are disk-shaped flanges that define the end of arms 254a, 254b, respectively. It is also contemplated that the enlarged portions on arms 254a, 254b may be spaced from arm ends 256a, 256b. It is understood that if the enlarged portions are not at the arm ends 256a, 256b, then the corresponding axial slots in the collar member 240 must also be positioned within collar member 240 to accept the enlarged portions.

As discussed above, pin member 210 has a pin head 211 with distal surface 214 and proximal surface 212. In one embodiment, distal surface 214 is substantially planar, but may have other geometries that mate with a proximal surface 340a of collar member 340, which is discussed below. For example, distal surface 214 of pin head 211 includes an annular protrusion, annular slot, or other geometry that mates with a corresponding geometry on proximal surface 340a of collar member 340. Distal surface 214 of pin head 211 may be concave, convex, or have some other geometry that mates with a correspondingly-shaped proximal surface 340a of collar member 340.

Proximal surface 212 of pin head 211 may be flat, domed, or recessed. For example, proximal surface 212 is domed and configured to be struck with a hammer to drive pin member 210 into a work piece similar to the act of driving a nail. In some embodiments, pin head 211 optionally includes a tool engaging recess 227, such as a slot, plus, hexagon, star, or other shape of recess useful for rotational engagement between pin member 210 and a tool.

Shaft 220 extends axially from distal surface 214 of pin head 211 to pin tip 224. In some embodiments, shaft 220 includes a bushing 226 or region of enlarged diameter that is located adjacent pin head 211. In some embodiments, bushing 226 abuts distal surface 214 of pin head 211. Bushing 226 functions as a stop to prevent pin member 210 from being driven into a work piece past the distal end 226b of bushing 226. Bushing 226 has a bushing length 226a that is greater than an axial thickness 240t of collar member 240. Therefore, bushing 226 maintains pin head 211 spaced from the work piece at least by bushing length 226a so that collar member 240 can freely rotate about shaft 220 between the work piece and pin head 211.

Shaft 220 optionally includes one or more retaining structures 223 that engage a work piece and prevent or resist removal of pin member 210 from the work piece. In one embodiment, retaining structures 223 are axially-sloped protrusions or annular ridges that extend circumferentially about shaft 220 and have a proximally-facing catch surface 223a. In other embodiments, retaining structure 223 is a tab, ring, roughened surface, flared protrusion, screw thread, or other structure that extends from shaft 220 to engage the work piece. Pin tip 224 may be rounded, sharpened, or blunt, depending on the method used to install pin member 210 in a work piece. In some embodiments, pin tip 224 is sharpened as found on a nail or screw.

Figure 12:
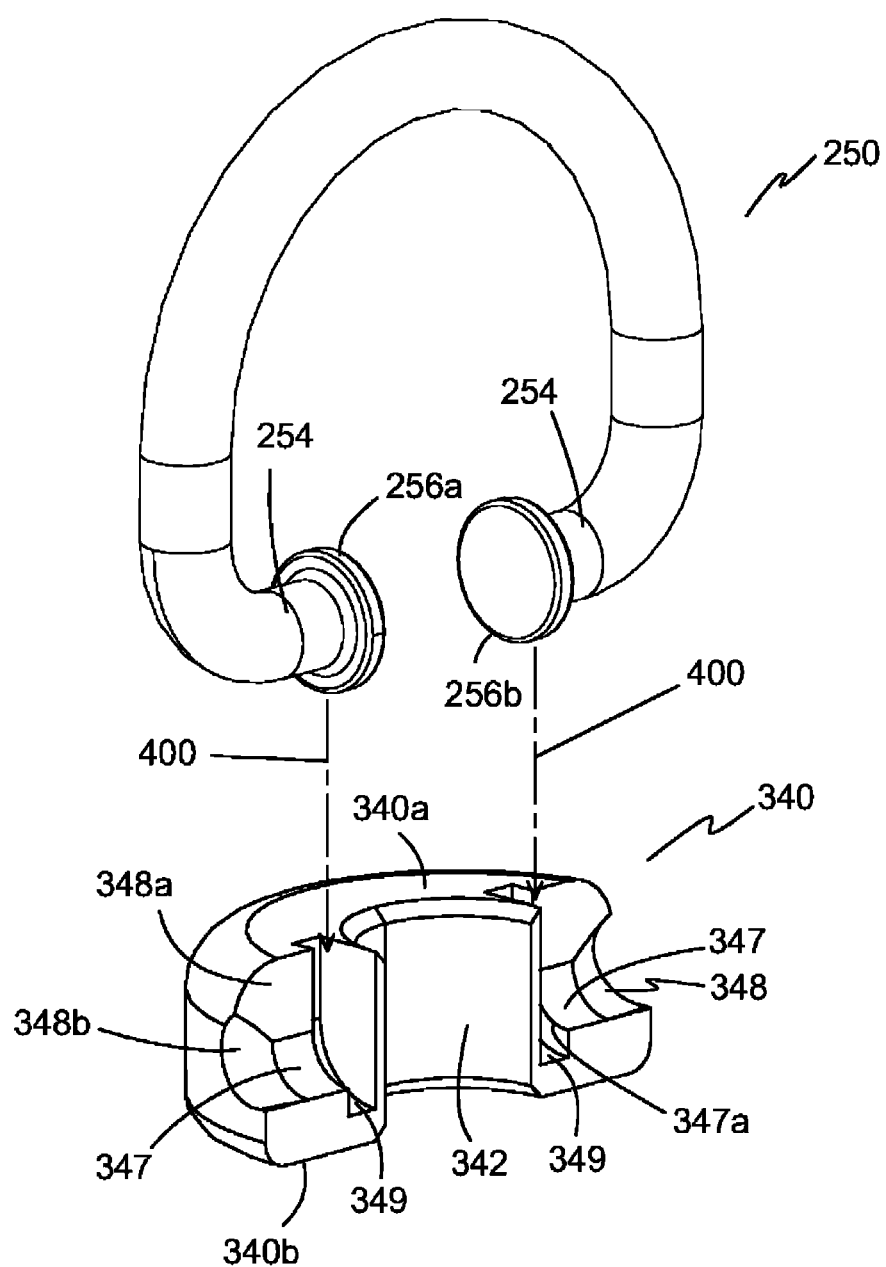
FIG. 12 illustrates a perspective view of the connector and a section of the collar member of FIG. 10, showing installation of the connector into recesses of the collar member.

FIG. 12 illustrates a perspective view of the connector and a section of the collar member of FIG. 11. In this embodiment, cap/collar member 340 has a round/circular, generally disk-like shape with a proximal surface 340a, a distal surface 340b, and a central aperture 342 extending axially therethrough. Cap/collar member 340 has side openings 347 that each extend transversely (e.g., radially) into cap/collar member 340 toward central aperture 342 and central axis 331. Preferably, an entrance 348 to each side opening 347 is recessed into cap/collar member 340 and shaped to permit rotation of connector 250 about side openings 347. One example of entrance 348 is a countersink or conical hole machined or formed into cap/collar member 340 at side openings 347. Another example of entrance 348 is one or more channels that intersect side opening 347 and extend transversely thereto.

Entrance 348 has an upper channel 348a and at least one side channel 348b. Preferably, channels 348a, 348b receive connector 250 and provide a preferred stopping point for connector 250 as it rotates about side openings 347 due to cap/collar member 340 causing ends 254 of connector 250 to separate slightly more at points of rotation between channels 348a, 348b. Thus, connector 250 in one embodiment occupies one of channels 348a, 348b and "snaps" to these positions due to its preference to return to its non-expanded state when rotated to occupy a channel 348.

Cap/collar member 340 optionally has an axial slot 349 at an inside end 347a of one or both of side openings 347, where inside end 347a of side opening 347 is the end towards central aperture 342. Axial slot(s) 349 extend axially into proximal surface 340a and define an open space in communication with side opening 347. Axial slots 349 are sized and configured to accommodate one of an end 256a, 256b of connector 250, such as a flange, ball, or other structure. As such, arms 254 of connector 250 are prevented from being pulled radially out of collar member 340. In one embodiment, axial slots 349 have a rectangular or arched cross-sectional shape as viewed from side opening 347 that permits insertion of end 256 of connector 250 in an axial direction from proximal surface 340a. As stated above, axial slot(s) 349 are positioned within cap/collar member 340 to coincide with the position of the enlarged portions on first and second arms 254a, 254b.

A domed proximal surface 212 also provides more space for rotation of connector 250 about a pivot axis 266 that extends through side openings 347 perpendicularly to central opening 342. Thus, when pin member 210 is assembled with connector 250 and collar member 340, pin head 211 partially or completely covers axial slots 349 and side openings 347, thereby preventing connector 250 from decoupling from cap/collar member 340.

Figure 13:
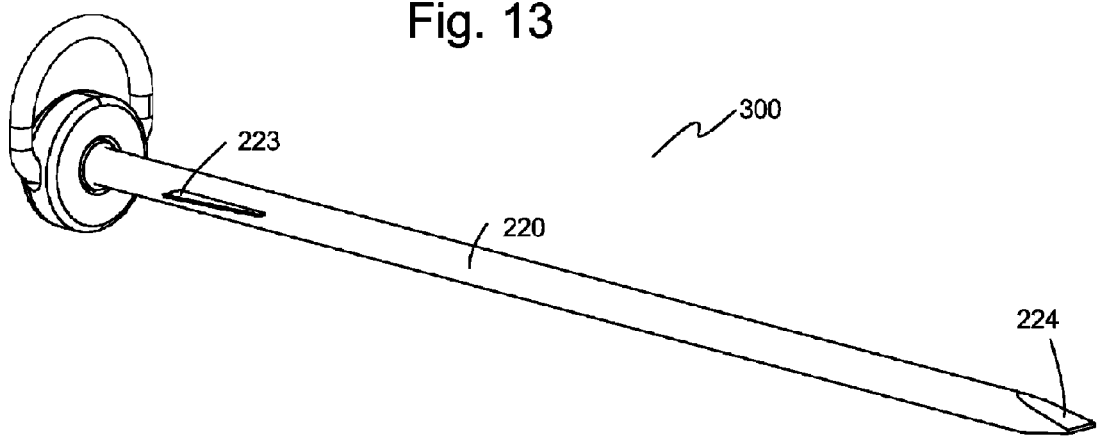
FIG. 13 illustrates a perspective view of another embodiment of a connector assembly of the present invention showing an elongated shaft with tool tip and retaining structures.

In some embodiments, shaft 220 is elongated and pin tip 224 is configured to function as a tool, such as a screwdriver or nut driver. FIG. 13 illustrates only one example of an elongated shaft 220. For example, pin tip 224 is configured as a flat or Phillips-head screwdriver tip, socket, hexagonal wrench, point, chisel tip, or other shape for engaging a fastener or work piece.

Figure 14:
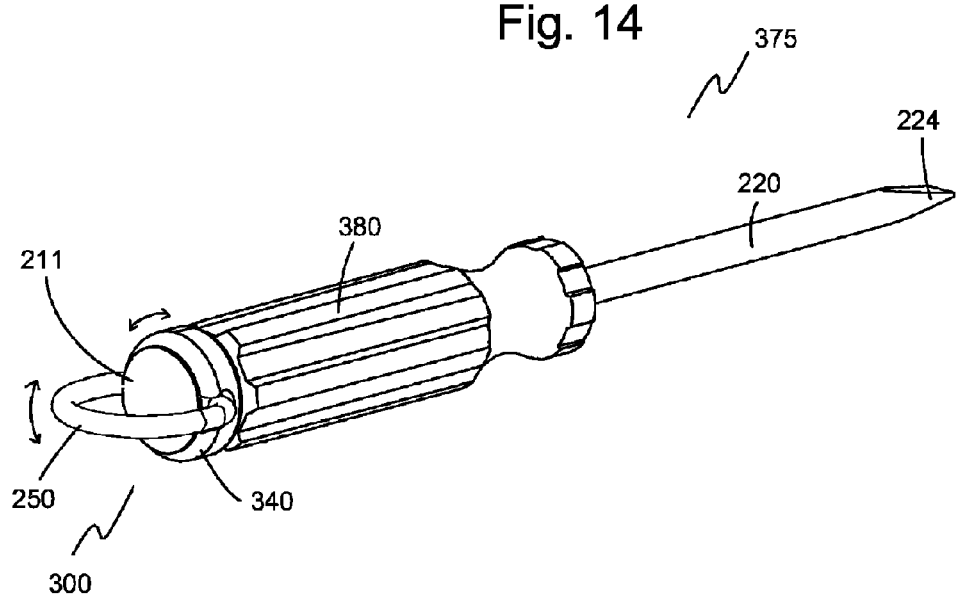
FIG. 14 illustrates an end, perspective view of another embodiment of a connector assembly of the present invention shown with a tool handle installed on the shaft and including a tool tip.

In one embodiment as illustrated in FIG. 14, a tool handle is formed on or installed on the elongated shaft 220 with pin tip 224 extending distally of the tool handle 380 as the functional end of a hand tool 375.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A swivel connector assembly for providing a swiveling and rotating attachment point to either a hand tool or a tool holder for a hand tool, the connector assembly comprising:
 a pin member having a pin head, and a pin shaft extending longitudinally from a shaft proximal end to a pin tip at a shaft distal end wherein the shaft proximal end is connected to the pin head and wherein the pin shaft has a shaft diameter smaller than the pin head;
 a connector having a connector body portion having a first body end and a second body end, a first arm connected to the first body end and having a free first arm end, and a second arm connected to the second body end and having a free second arm end wherein the first arm end and the second arm end extend toward each other forming a gap between the first arm end and the second arm end, and wherein the connector body portion, the first arm and the second arm define a partially-closed loop with the gap between the first arm end and the second arm end; and
 a collar member having an annular body with a top surface, a bottom surface, a circumferential portion between the top surface and the bottom surface, the annular body defining
  (1) a central aperture extending axially through the annular body between the top surface and the bottom surface, the central aperture sized to rotatably receive the pin shaft and permit free rotation of the collar member about the pin shaft,
  (2) a first radial aperture extending transversely through the circumferential portion into the annular body towards the central aperture, and
  (3) a second radial aperture extending transversely through the circumferential portion into the annular body towards the central aperture, the second radial aperture being coaxially aligned with the first radial aperture, wherein the first arm and the second arm of the connector are disposed within the first radial aperture and the second radial aperture, respectively, whereby the first radial aperture and the second radial aperture permit rotation of the connector about the first arm and the second arm, and
 a disc member with a central disc aperture disposed between the collar member and the pin head with the pin shaft extending through the central disc aperture;
 wherein the pin member extends through the central aperture of the collar member to connect the hand tool or the tool holder for the hand tool to the connector assembly and to thereby retain the connector in coupling engagement to the collar member while permitting free rotation of the collar member about the pin member.

2. The connector assembly of claim 1 wherein the collar member includes a first axial slot and a second axial slot that each extends into the annular body through either the top surface or the bottom surface and into the first radial aperture and the second radial aperture, respectively, each of the first axial slot and the second axial slot having a cross-section that is larger than the cross-section of the respective first radial aperture and the second radial aperture, and wherein the first arm end and the second are end of the connector are larger than the respective cross-section of the first arm and second arm wherein the first arm end and the second arm end are rotatably disposed within the first axial slot and the second axial slot, respectively.

3. The connector assembly of claim 2, wherein the first arm end and the second arm end each have a geometry selected from the group consisting of a ball, a flange, a disk, and a protrusion.

4. The connector assembly of claim 2 wherein the first axial slot and the second axial slot extend through the bottom surface of the collar member, and wherein the first arm end and the second arm end of the connector are received between the collar member and the disc member.

5. The connector assembly of claim 4 wherein the disc member has an annular disc recess in a top surface of the disc member.

6. The connector assembly of claim 2, wherein, when the first axial slot and the second axial slot extend into the annular body from the top surface, the pin shaft is threaded and wherein the pin head defines a tool-engaging recess configured to engage a working end of a hand tool, the tool-engaging recess having a shape selected from the group consisting of a slot, a plus, a square, a triangle, a hexagon, and a star.

7. The connector assembly of claim 2, wherein, when the first axial slot and the second axial slot extend into the annular body from the top surface, the pin shaft has a retaining structure protruding radially from the pin shaft.

8. The connector assembly of claim 7, wherein the retaining structure is selected from the group consisting of one or more tabs, one or more wing-shaped protrusions, and a screw thread.

9. The connector assembly of claim 1 wherein at least the first radial aperture of the collar member has an upper channel and at least one side channel within the circumferential portion of the collar member whereby the upper channel and the at least one side channel each defines a stopping point for the first arm of the connector as it rotates within the first radial aperture.

10. The connector assembly of claim 1 wherein the second radial aperture of the collar member has an upper channel and at least one side channel within the circumferential portion of the collar member whereby the upper channel and the at least one side channel each defines a stopping point for the second arm of the connector as it rotates within the second radial aperture.

11. The connector assembly of claim 1 wherein the top surface of the collar member has a recess coaxial with and a of greater diameter than the central aperture.

12. The connector assembly of claim 11 wherein the shaft distal end is a split shaft having a slot extending axially into at least the pin tip and wherein the pin tip has a catch surface that extends radially from the shaft distal end and is received within the recess.

13. The connector assembly of claim 1 further comprising a pin bushing connected to the pin shaft and adjacent the pin head wherein the pin bushing has a diameter greater than the pin shaft and smaller than the pin head thereby forming a bushing stop.

14. The connector assembly of claim 13 wherein the central aperture is sized to rotatably receive the pin bushing and permit free rotation of the collar member about the pin bushing.

15. The connector assembly of claim 13, wherein the pin shaft is elongated and the pin tip comprises a tool.

16. The connector assembly of claim 15, further comprising a tool handle attached to the pin shaft adjacent the collar member.

17. A method of assembling a swivel connection assembly according to claim 1, the method comprising:
- coupling the connector to the collar member by inserting the first arm of the connector into the first radial aperture and inserting the second arm of the connector into the second radial aperture whereby the connector freely rotates within the first radial aperture and the second radial aperture;
- inserting the pin member through the central aperture of the collar member to thereby retain the connector in coupling engagement to the collar member while permitting free rotation of the collar member about the pin member; and
- connecting the swivel connector assembly to either a hand tool or a tool holder for a hand tool.

18. A method for providing a swiveling and rotating attachment point to a hand tool or a tool holder for a hand tool, the method comprising:
- providing a swivel connector comprising:
  - (1) a connector defining a partially closed loop wherein the partially closed loop has a first arm end and a second arm end wherein the first arm end and the second arm end extend toward each forming a gap between the first arm end and the second arm end,
  - (2) a collar member having an annular body with a circumferential portion wherein the collar member defines a central aperture therethrough, a first radial aperture extending transversely through the circumferential portion towards the central aperture, and a second radial aperture being radially aligned with the first radial aperture wherein the second radial aperture extends transversely through the circumferential portion toward the central aperture and wherein the first arm end is pivotally disposed within the first radial aperture and the second arm end is pivotally disposed within the second radial aperture, and
  - (3) a pin member having a pin head and a pin shaft wherein the pin shaft extends through the central aperture of the collar member to retain the connector in coupling engagement to the collar member while permitting free rotation of the collar member about the pin shaft; and
  - (4) a disc member with a central disc aperture disposed between the collar member and the pin head with the pin shaft extending through the central disc aperture, and attaching the swivel connector to either the hand tool or the tool holder for a hand tool.

\* \* \* \* \*